(12) United States Patent
Blair et al.

(10) Patent No.: US 8,095,120 B1
(45) Date of Patent: Jan. 10, 2012

(54) SYSTEM AND METHOD OF SYNCHRONIZING MULTIPLE MICROPHONE AND SPEAKER-EQUIPPED DEVICES TO CREATE A CONFERENCED AREA NETWORK

(75) Inventors: Colin Blair, Westleigh (AU); Andrew W. Lang, Epping (AU); Paul Roller Michaelis, Louisville, CO (US); Deborah Jeanne Hill, Broomfield, CO (US); Kevin Chan, Ryde (AU); Christopher R. Gentle, Gladesville (AU); Neil Hepworth, Artarmon (AU)

(73) Assignee: Avaya Inc., Basking Ridge, NJ (US)

( * ) Notice: Subject to any disclaimer, the term of this patent is extended or adjusted under 35 U.S.C. 154(b) by 1128 days.

(21) Appl. No.: 11/864,021

(22) Filed: Sep. 28, 2007

(51) Int. Cl.
*H04M 3/42* (2006.01)
*H04B 7/00* (2006.01)
(52) U.S. Cl. .... 455/416; 455/463; 455/518; 379/202.01
(58) Field of Classification Search .................. 455/416; 370/338, 347; 381/119; 379/202.01, 205.01
See application file for complete search history.

(56) References Cited

U.S. PATENT DOCUMENTS

| 6,987,992 | B2 | 1/2006 | Hundal et al. | |
|---|---|---|---|---|
| 2004/0058674 | A1* | 3/2004 | Yoakum | 455/416 |
| 2006/0147063 | A1* | 7/2006 | Chen | 381/119 |
| 2007/0286134 | A1* | 12/2007 | Kirke | 370/338 |

OTHER PUBLICATIONS

Schobben, Daniel Willem Elisabeth, Abstract of "Efficient adaptive multi-channel concepts in acousitics: Blind signal separation and echo cancellation", Technische Universiteit Eindhoven (The Netherlands), 1999, retrieved from Internet site http://adsabs.harvard.edu/abs/1999PhDT.......268S on Aug. 21, 2007, 2 pages.
ClearOne, "Tabletop Conferencing, MAXAttach IP" retrieved from internet site http://www.clearone.com/products/product.php?cat=3&prod=13 on Aug. 21, 2007, 2 pages.
U.S. Appl. No. 10/830,166, filed Apr. 21, 2004, Pat French.

* cited by examiner

*Primary Examiner* — Kiet Doan
(74) *Attorney, Agent, or Firm* — Sheridan Ross P.C.

(57) ABSTRACT

The present invention provides methods, devices, and systems for creating an ad-hoc conference station from speakers on a plurality of mobile communication devices. The ad-hoc conference station can cancel the echo of any incoming audio for all of the communication devices. This feature may be achieved by employing a master/slave configuration for the communication devices within a common area.

20 Claims, 6 Drawing Sheets

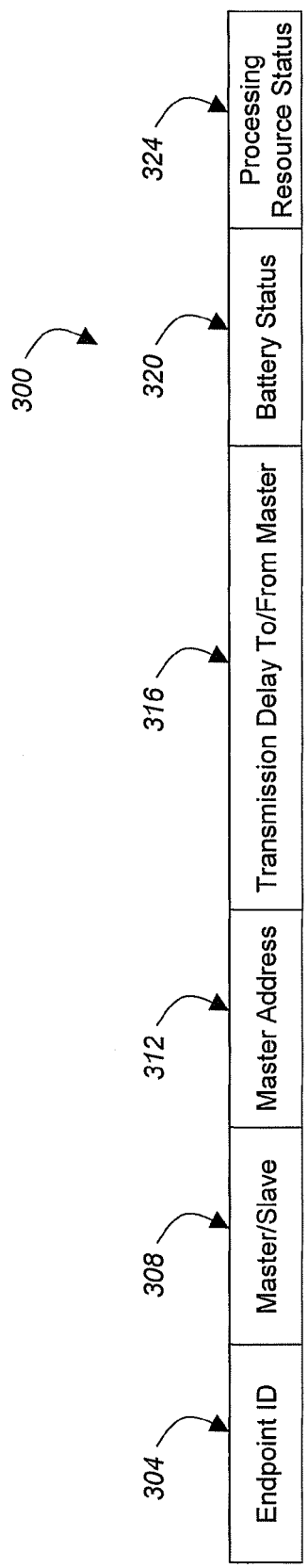
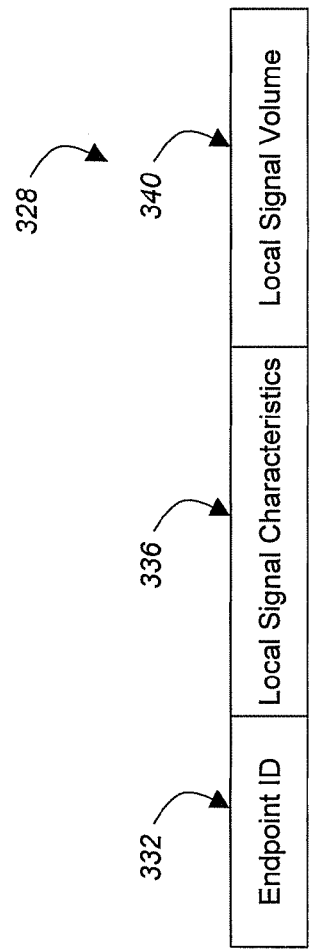
Fig. 3A
Fig. 3B

SYSTEM AND METHOD OF SYNCHRONIZING MULTIPLE MICROPHONE AND SPEAKER-EQUIPPED DEVICES TO CREATE A CONFERENCED AREA NETWORK

FIELD OF THE INVENTION

The invention relates generally to communication systems and more particularly to ad-hoc conferencing solutions.

BACKGROUND

Often times a group of people will find themselves at a random location and desire to have a conference call with people at other remote communication devices. When a group of people find themselves in such a situation it is often the case that a telephone specially configured to conference a group of people together is unavailable. If there is a speakerphone available it may not have enough speaker volume or microphone sensitivity to adequately serve as a conference phone for all of the people at the location. Moreover, even if the conference location is equipped with a speakerphone capable of supporting a large number of conference participants, there is no guarantee that the location will allow all of the participants around the speakerphone.

With the proliferation of the mobile (cellular) phone and other mobile communication devices such as laptop computers and the like, many people now carry mobile communication devices. It would be desirable to provide people the ability to set up a conference at any random location by coordinating their mobile devices in an ad-hoc fashion.

SUMMARY

These and other needs are addressed by various embodiments and configurations of the present invention. The present invention is directed generally to a system, device, and method for creating an ad-hoc wide-area audio conference station from a plurality of mobile telephone speakers and microphones. The method generally comprises:

a first communication device detecting or being connected to a second communication device within communication range of the first mobile device;

determining that a user of the first communication device and a user of the second communication device want to participate in a common conference;

receiving local audio at the first communication device;

receiving local audio at the second communication device;

transmitting data representing the local audio received at the second communication device to the first communication device via a faster than the speed of sound connection; and transmitting data representing the local audio received at the first and second communication devices to a remote communication device that is also part of the common conference.

As used herein, the terms "faster than the speed of sound" and "faster than audio" connection are used interchangeably. Such connections may include wired and/or wireless data connections between two or more communication devices.

The common conference may comprise any type of communication session between the first and second communication devices and at least a third remote device. The first and second communication devices may be any type of known communication device including, for example, cellular phones, Personal Digital Assistants (PDAs), portable email retrieval devices, mobile music playing devices such as an MP3 player, AM/FM radio, CD player or the like, laptops, personal computers, speakerphones, traditional phones, and/or any other type of mobile communication device.

The communication session is generally an audio communication session whereby the speakers and microphones of the first and second communication devices are synchronized to represent a single virtual communication device to the third remote mobile device. In accordance with at least some embodiments of the present invention, additional devices may be synchronized with the first and second devices to share the speaker/microphone resources of each communication device. Additional devices that are brought into the common conference may become part of the single virtual communication device as long as they are within a wired or wireless communication range of the virtual communication device.

The use of a faster than audio connection to transfer data between mobile devices is advantageous in that it helps ensure that proper echo/feedback cancellation is performed for the local audio received at both the first and second devices. It is the faster than audio connection that helps combine a number of different devices into a single virtual communication device. Local audio may be received at the microphones of each different communication device and can be transferred to a common node within the virtual communication device by the faster than audio connection. This way the common node can receive multiple copies of the same sound received by each microphone, cancel the echo/feedback between the various copies and create a single copy for transmission to the remote communication device.

Moreover, the use of a faster than audio connection to transfer data helps to reduce the delay between when local audio is received at a particular device (e.g., the second mobile device) and when it is transmitted to a remote communication device on behalf of the single virtual communication device. Accordingly, the data representing the local audio (i.e., data that was received from a plurality of different microphones or the like) can be transmitted to the remote communication device as a clear and concise representation of all audio received by the devices receiving local audio (e.g., the first and second mobile devices).

As used herein, "local audio" may comprise any sounds or speech received by the microphone of the first or second mobile device. The local audio may include speech uttered by a user of one mobile device as well as audio signals played by speakers of the other mobile devices. The proximity of mobile devices may be such that each mobile device receives the speech uttered by both users of the mobile devices. Under these circumstances the louder or clearer audio signal may be selected for transmission to the rest of the conference participants.

In accordance at least some embodiments of the present invention, a mobile device is also provided. The mobile device generally including:

a microphone for receiving local audio;

a conferencing module operable to establish a faster than audio data connection with a second mobile device, receive data that represents local audio received at the second mobile device, wherein the data is received from the second mobile device over the faster than audio data connection, wherein the conferencing module is further operable to combine the data received from the second mobile device with local audio received by the microphone and transmit the combined data to a remote communication device.

In accordance with at least some other embodiments of the present invention, an ad-hoc conferencing system is provided. The conferencing system generally includes:

a plurality of local conference endpoints in communication with at least one remote conference endpoint, wherein the plurality of local conference endpoints communicate data with one another via a faster than the speed of sound connection, wherein audio signals are transmitted from at least one remote conferenced endpoint to a first endpoint in the plurality of local conference endpoint, and wherein the first endpoint is operable to transmit the audio signals to a second of the plurality of local conference endpoints via the faster than the speed of sound connection and cause the audio signals to be played from the first endpoint at substantially the same time as the audio signals are played from the second endpoint.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

It is to be noted that the term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

FIG. 3A is a diagram depicting a first data structure that may be employed in accordance with embodiments of the present invention;

FIG. 3B is a diagram depicting a second data structure that may be employed in accordance with embodiments of the present invention;

DETAILED DESCRIPTION

The invention will be illustrated below in conjunction with an exemplary communication system. Although well suited for use with, e.g., a system using a server(s) and/or database (s), the invention is not limited to use with any particular type of communication system or configuration of system elements. Those skilled in the art will recognize that the disclosed techniques may be used in any communication application in which it is desirable to create an ad-hoc conference station.

The exemplary systems and methods of this invention will also be described in relation to communications software, modules, and associated communication hardware. However, to avoid unnecessarily obscuring the present invention, the following description omits well-known structures, network components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Furthermore, while the exemplary embodiments illustrated herein show the various components of the system collocated, it is to be appreciated that the various components of the system can be located at distant portions of a distributed network, such as a communication network and/or the Internet, or within a dedicated secure, unsecured and/or encrypted system. Thus, it should be appreciated that the components of the system can be combined into one or more devices, such as an enterprise server, a PBX, or collocated on a particular node of a distributed network, such as an analog and/or digital communication network. As will be appreciated from the following description, and for reasons of computational efficiency, the components of the system can be arranged at any location within a distributed network without affecting the operation of the system. For example, the various components can be located in a local server, at one or more users' premises, or some combination thereof. Similarly, one or more functional portions of the system could be distributed between a server, gateway, PBX, and/or associated communication device.

Figure 1:
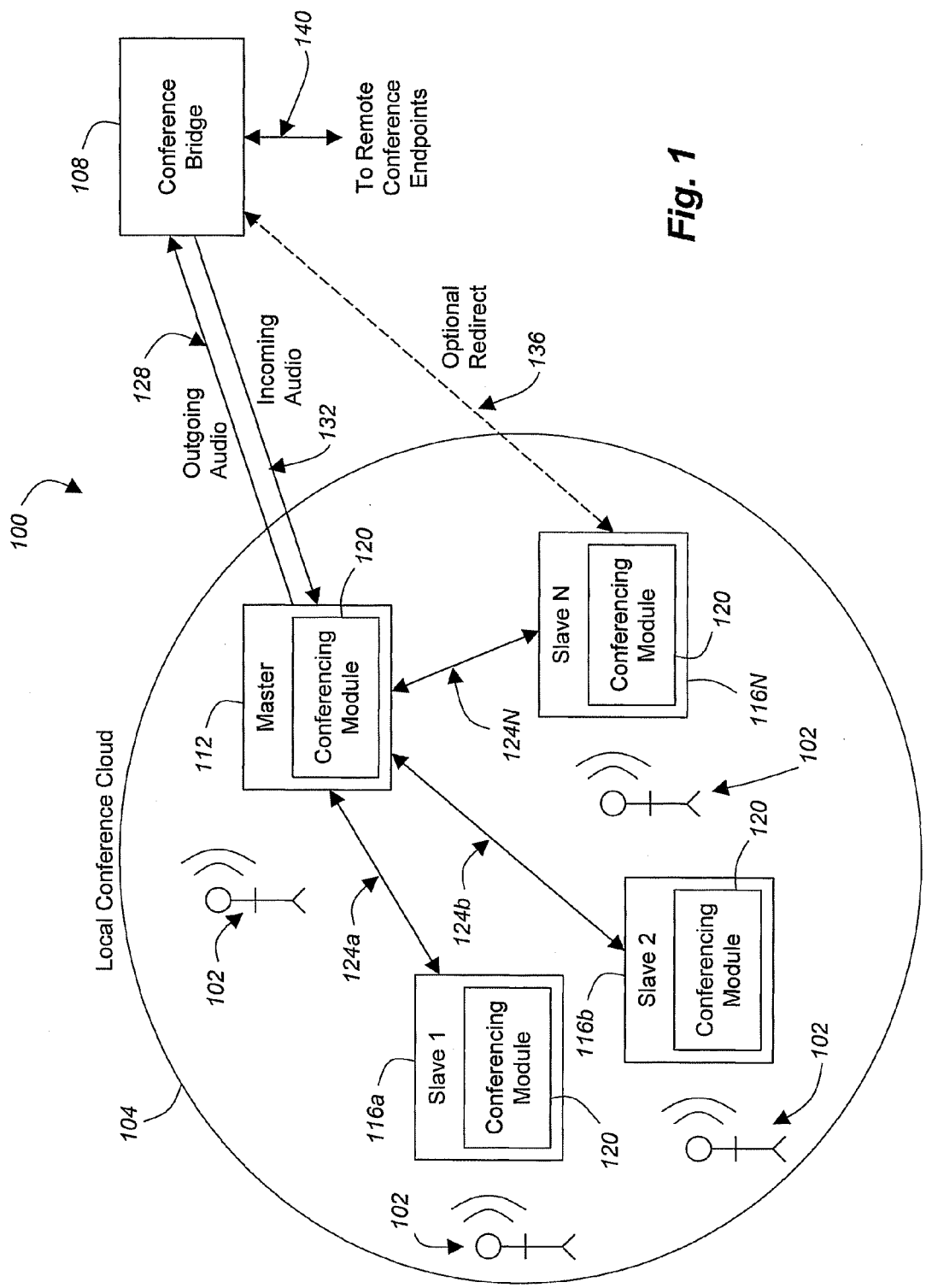
FIG. 1 is a block diagram of a communication system having a first configuration in accordance with embodiments of the present invention.

Referring initially to FIG. 1, a communication system 100 will be described in accordance with at least some embodiments of the present invention. The communication system 100 generally comprises a local conference cloud in communication with a communication device such as a conference bridge 108. The conference bridge 108 may provide a conferencing capability between the local conference cloud 104 and one or more additional communication devices such as remote conference endpoints via a remote endpoints connection 140. As can be appreciated by one skilled in the art, a conference comprising a large number of remote conference endpoints may have a greater need for a conference bridge 108 than a conference between the local conference cloud 104 and a single remote conference endpoint. In such a situation (e.g., situations with one or a small number of remote conference endpoints), the local conference cloud 104 may be directly connected to the remote endpoint(s).

The connection between the local conference cloud 104 and any remote communication devices such as the conference bridge 108 and remote endpoints may be facilitated by a communication network. The communication network employed to create such an audio connection may comprise any type of information transportation medium and may use any type of protocols to transport messages between endpoints. The communication network may include wired and/or wireless communication technologies. The Internet is an example of the communication network that constitutes an IP network consisting of many computers and other communication devices located all over the world, which are connected through many telephone systems and other means. Other examples of a communication network include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, and any other type of packet-switched or circuit-switched network known in the art. In addition, it can be appreciated that the communication network need not be limited to any one network type, and instead may be comprised of a number of different networks and/or network types.

The local conference cloud 104 may comprise a plurality of local endpoints 112, 116 in communication with one another via a faster than audio connection. In accordance with at least some embodiments of the present invention, the local conference cloud 104 may be created in an ad-hoc fashion through the use of a wireless conferencing and data transmission protocol such as, for example, Bluetooth, infrared, or any other type of wireless communication protocol employing Radio Frequency (RF) signals. Alternatively, the local conference cloud 104 may be created through the use of a wired connection between two or more endpoints 112, 116 in the local conference cloud 104. A combination of wired and wireless connections may also be used to create the local conference cloud 104. Traditional Bluetooth technology, which is well known in the communication arts, has been used to create Personal Area Networks (PANs) between many devices associated with a single user. In accordance with embodiments of the present invention, Bluetooth or any similar device communication protocol may be used to create local conference cloud 104, which may also be referred to as a Conferenced Area Network (CAN). Each local endpoint 112, 116 is in bi-directional communication with at least one other local endpoint 112, 116 via a faster than audio connection 124a-N. The scope of the local conference cloud 104 may be defined by the wireless communication range of the local endpoints 112, 116 as well as the range defined by the data transmission protocol. For example, certain Bluetooth profiles may impose a limit of between about 10 m and 50 m for data transmission between local endpoints 112, 116. Any mobile device that is farther away from the local conference cloud 104 than that may not be able to communicate with the rest of the local conference cloud 104 through the faster than audio data connection.

The local endpoints 112, 116 may comprise any type of mobile device that is capable of being brought into a random location by a user 102. Examples of suitable local endpoints 112, 116 include a mobile phone, a cellular phone, a laptop, a portable email retrieval device, a Personal Digital Assistant (PDA), a speakerphone, traditional phones, personal computers, music playing devices, or any other type of device comprising a microphone and/or speaker. The local endpoints 112, 116 may each comprise a microphone for receiving local audio from local audio sources such as users 102, a speaker for playing audio signals for the users 102, and a conferencing module 120. The conferencing module 120 within a local endpoint 112, 116 is used to setup and negotiate conferencing conditions, such as which local endpoint 112, 116 will be a master device 112 and which local endpoint 112, 116 will be a slave device 116a-N. In accordance with at least one embodiment of the present invention, the master device 112 selects itself if it determines that it comprises more processing resources (e.g., processor capacity, memory, etc.) than any other local endpoint 112, 116 that is detected. Once a master/slave relationship has been established between at least two local endpoints 112, 116, then that particular hierarchy may be maintained for any subsequent addition of local endpoints to the local conference cloud 104. In other words, once a master 112 has been selected for the local conference cloud 104, that local endpoint may remain a master 112 unless it begins running low on resources (e.g., processor resources and/or battery resources) or unless a significantly better equipped communication device enters the local conference cloud 104.

The utilization of a master/slave hierarchy (i.e., a local conference cloud 104 with only one master 112 and the rest slaves 116) is not necessarily required to realize the benefits of the present invention. However, use of a master/slave configuration allows the local conference cloud 104 to appear as a single communication device to the conference bridge 108. Accordingly, the amount of processing required by the conference bridge 108 is reduced because it treats the local conference cloud 104 as a single conference endpoint.

In accordance with at least some embodiments of the present invention, each of the slave endpoints 116a-N are adapted to receive local audio from one or more users 102 within the local conference cloud 104. The conferencing module 120 residing on each of the slave endpoints 116a-N may be adapted to cancel any echo/feedback in the local audio received at its microphone. An example of a possible echo cancellation algorithm that may be employed by the conferencing module 120 is described in U.S. Pat. No. 6,987,992 as well as U.S. Patent Application No. 2006/0147063, both of which are incorporated herein by reference in their entirety. These particular patent documents describe methods of canceling echo when multiple wireless microphones are used in connection with a single speaker source. Another form of echo cancellation that may be employed by the conferencing module 120 is described by Schobben in "Efficient Adaptive Multi-Channel Concepts in Acoustics: Blind Signal Separation and Echo Cancellation," the entire contents of which are also incorporated herein by reference. Schobben describes a method of blind signal separation and acoustic echo cancellation whereby blind signal separation is used to extract the individual speech signals from multiple microphone signals when several speakers are talking simultaneously.

The conferencing module 120 of each slave endpoint 116a-N may then transmit the received local audio to the master endpoint 112 via the faster than audio connection 124a-N. The conferencing module 120 of the master endpoint 112 may then cancel any additional echo/feedback or other duplication of local audio between all of the audio signals received from the slave endpoints 116 as well as local audio received at the microphone of the master endpoint 112. The master endpoint 112 may cancel the echo between all of the local audios by comparing the volumes of each local audio signal received and selecting the signal having the highest volume for transmission as the outgoing audio 128. All other signals may be cancelled or ignored until their volume for a particular local audio signal exceeds the volume of all other local audio signals received by the other slave endpoints 116.

After the conferencing module 120 has cancelled the echo from all of the received audio signals, it transmits the audio signal as an outgoing audio signal 128 to the remote endpoints. The outgoing audio signal 128 may be transmitted to each remote endpoint through the conference bridge 108 where it can be mixed with any other audio signals received from other conference participants. Alternatively, the outgoing audio signal 128 may be transmitted directly to the remote endpoint(s).

Similarly, audio directed toward the local conference cloud 104 may be transmitted to the master endpoint 112 from the remote endpoint or conference bridge 108 via an incoming audio stream 132. The outgoing audio 128 and incoming audio 132 may share a common bi-directional connection established over the communication network. The incoming audio 132 may be processed by the conferencing module 120 of the master endpoint 112 and distributed to the rest of the local endpoints 116 via the faster than audio connection 124a-N. Although the master endpoint 112 is equipped to immediately playback the incoming audio 132 from its speaker, the conferencing module 120 of the master endpoint 112 may be adapted to delay such playback until the incoming audio 132 has been distributed to all of the slave endpoints 116 at which time all of the local endpoints 112, 116 may playback the incoming audio 132 at substantially the same time (i.e., the exact same time but with an allowance for some amount of processor error on the order of microseconds to milliseconds). By delaying the playback of the incoming audio 132 at the master endpoint 112 such that all speakers of the local endpoints 112, 116 playback the incoming audio 132 at substantially the same time, the volume of the incoming audio 132 can be played at a significantly higher level and be better dispersed for all of the users 102 as compared to if a single communication device were used in the local conference cloud 104.

In this configuration of local conference cloud 104 elements, the master endpoint 112 acts as a gateway for the endpoints 112, 116 in the local conference cloud 104 to/from the rest of the conference. The amount of resources required of the master endpoint 112 may vary based upon the amount of echo cancellation and delay processing that is desired for the local conference cloud 104. Additionally, the number of local endpoints 112, 116 that join the conference may increase the strain on the limited processing resources of a master endpoint 112. Therefore, in accordance with at least some embodiments of the present invention, the conferencing module 120 of the master endpoint 112 may monitor the resources of the master endpoint 112 to determine if a second endpoint needs to be recruited to share the master endpoint 112 responsibilities. If the master endpoint 112 determines that master responsibilities need to be shared, then an optional redirect path 136 may be established between one of the former slave endpoints 116 (e.g., slave endpoint 116N) and the remote endpoint or conference bridge 108. The optional redirect path 136 is similar to the outgoing 128 and incoming 132 audio path established between the master endpoint 112 and the conference bridge 108. The former slave endpoint 116 and master endpoint 112 may then split processing duties for the local conference cloud 104. More specifically, the master endpoint 112 may serve a first set of slave endpoints 116 in the local conference cloud 104 while the former slave endpoint 116 may serve a second set of slave endpoints 116, where the first and second sets of slave endpoints 116 are mutually exclusive but completely exhaustive of the slave endpoints in the local conference cloud 104.

Alternatively, the optional redirect path 136 may be established if the master endpoint 112 determines that it is about to run out of batteries, in which case the former slave endpoint 116 will begin serving all of the other slave endpoints 116. If an optional redirect path 136 is established between the former slave endpoint 116 and the conference bridge 108, then new communication paths 124 may also be set up between the former slave endpoint 116 and at least some of the other slave endpoints 116. In accordance with at least one embodiment, the communication paths 124 may comprise wireless communication paths that are established in an ad-hoc manner. Alternatively, the communication paths 124 may comprise some sort of wired connection. As users 102 leave the local conference cloud 104 and take their respective mobile device with them, the master/slave relationships between the other local endpoints 112, 116 are generally left unchanged. The only instance where a reconfiguration of the local conference cloud 104 would be required is when a master endpoint 112 is removed from the local conference cloud 104. In this particular situation an optional redirect path 136 may also become necessary. If a master endpoint 112 is removed from the local conference cloud 104 it is not necessarily the case that the mobile device formerly the master endpoint 112 has to disconnect from the conference bridge 108. Rather, the mobile device may continue to be connected to the conference bridge 108 thereby allowing its user to participate in the conference, but the master endpoint 112 will no longer have the capability to share the microphones/speakers of the local endpoints 112, 116 still in the local conference cloud 104.

Figure 2:
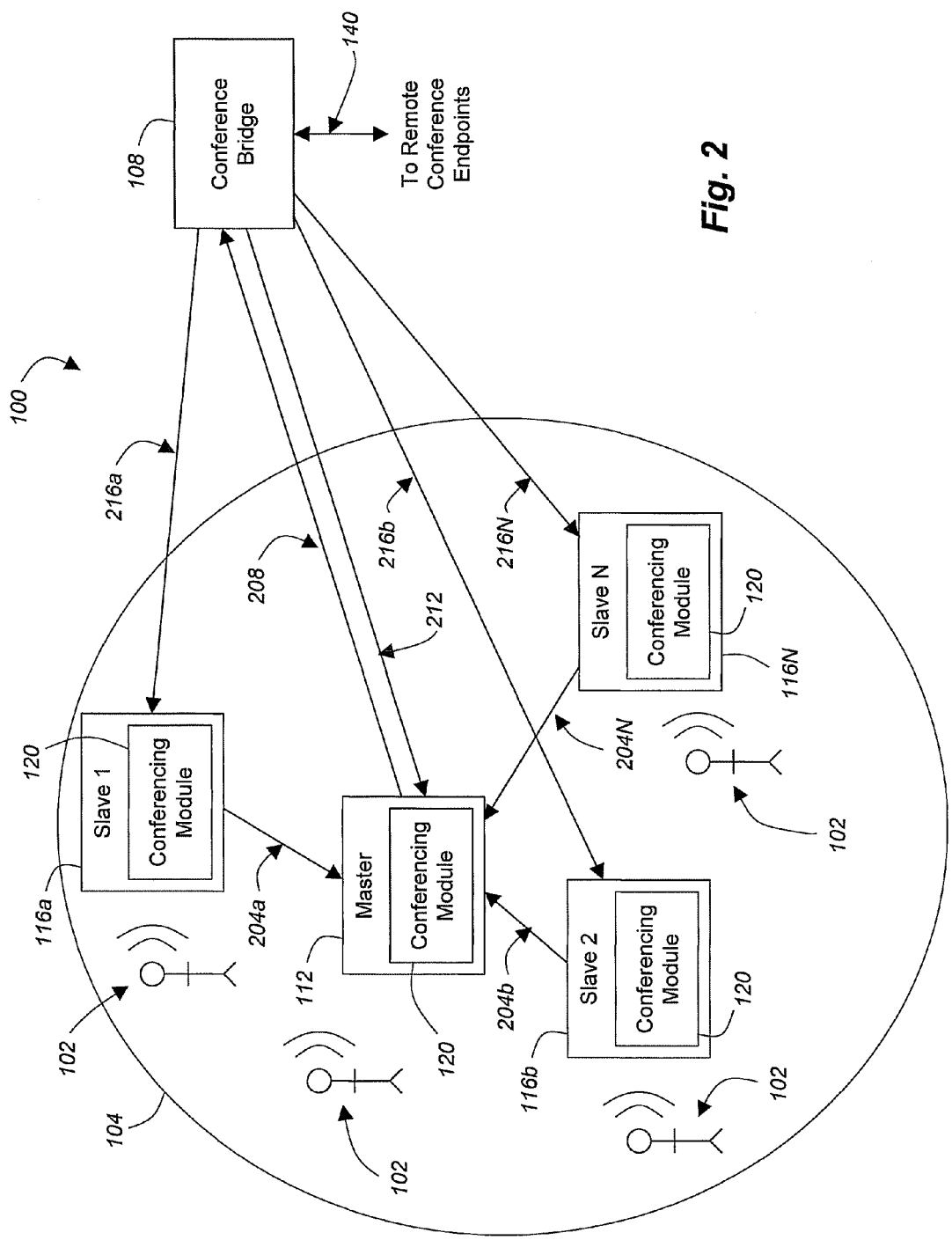
FIG. 2 is a block diagram of a communication system having a second configuration in accordance with embodiments of the present invention.

With reference now to FIG. 2, an alternative configuration of system 100 elements is depicted in accordance with at least one embodiment of the present invention. The system 100 elements may remain the same, however, the data communication paths between the conference bridge 108 or remote endpoint and each of the local endpoints 112, 116 may be altered. As can be seen in the depicted example, faster than audio communication paths or connections 204a-N may still be established between each of the slave endpoints 116a-N and the master endpoint 112. The difference between the connections 204a-N and the connections 124a-N is that the connections 204a-N are unidirectional whereas the connections 124a-N are bi-directional. The connections 204a-N may be used to carry local audio from a slave endpoint 116 to a master endpoint 112 where echo cancellation can occur. The master endpoint 112 may then provide the local audio received by all microphones in the local conference cloud 104 to the conference bridge 108 as an outgoing audio signal 208.

In accordance with at least some embodiments of the present invention, the conference bridge 108 may provide audio to the local conference cloud 104 via a plurality of incoming audio signals 212, 216a-N. A first incoming audio signal 212 may be provided from the conference bridge 108 to the master endpoint 112. Additional incoming audio signals 216a-N may be provided to one or more of the slave endpoints 116a-N in the local conference cloud 104. Utilization of multiple incoming audio signals 212, 216a-N helps relieve the amount of processing required of the master endpoint 112. However, the ability to control and synchronize playback of the incoming audio may be compromised since some of the incoming audio signals 216a-N are not controlled by the master endpoint 112. Accordingly, the configuration of the local conference cloud 104 between a single incoming audio signal 132 and a plurality of incoming audio signals 212, 216a-N may be configured based on user 102 preferences and conference quality requirements.

With reference to FIGS. 3A and 3B two data structures 300, 328 will be described in accordance with at least some embodiments of the present invention. The first data structure 300 depicted in FIG. 3A may be used in the establishment and maintenance of the local conference cloud 104 as well as in the synchronization of playback of the incoming audio 132. The first data structure 300 may comprise an endpoint identifier field 304, a master/slave field 308, a master address field 312, a transmission delay field 316, a battery status field 320, and a resource status field 324. As can be appreciated by one skilled in the art, the entire first data structure 300 may be maintained in one or all of the local endpoints 112, 116. Alternatively, portions of the first data structure 300 may be distributed throughout the local endpoints 112, 116. For example, the master endpoint 112 may maintain the endpoint identifier field 304, the master/slave field 308, the transmission delay field 316, the battery status field 320, and the resource status field 324 while the slave endpoints 116 may comprise another instance of the master/slave field 308 and the master address field 312.

The endpoint identifier field 304 may be employed to store the identification information for each local endpoint 112, 116 in the local conference cloud 104. The identification information maintained in the endpoint identifier field 304 may comprise phone numbers, extensions, IP addresses, email addresses, dynamically assigned addresses, device IDs/names, Media Access Control (MAC) addresses, device profile information, and any other data that can be used to differentiate each of the local endpoints 112, 116 and address data communications from one endpoint to another.

When mobile devices are brought within the proper distance of one another such that they can initiate wireless communications a master/slave relationship may also be negotiated between the devices. This relationship may be user 102 selected or automatically selected based on which mobile device comprises the greatest amount of resources (e.g., processing resources and power resources). As an example, the mobile device having the greatest amount of memory or processor capacity may be automatically selected as the master endpoint 112. Alternatively, the mobile device that is running on an external power source (e.g., is plugged in to a power grid) as opposed to relying upon a local power source (e.g., a battery) may be selected as the master endpoint 112. The master/slave relationship may be represented in the master/slave field 308. More specifically, if a particular mobile device is been designated as a master endpoint 112, then an indication of master will be maintained in the master slave field 308, whereas if a mobile device is designated as a slave endpoint 116, then that indication is provided.

A copy of the master endpoint's 112 identification information may be maintained in the master address field 312. The master address field 312 may be used by the slave endpoints 116 to transmit local audio signals received by their microphones to the master endpoint 112. The master endpoint 112, on the other hand, may use the endpoint identification field 304 to address the incoming audio to each of the slave endpoints 116a-N.

In addition to using the endpoint identification field 304 for distributing incoming audio 132, the master endpoint 112 may also employ the information from the transmission delay field 316. The transmission delay field 316 may be populated by transmitting test signals from the master endpoint 112 to each slave endpoint 116 where the signal comprises a time of transmission identifier. Upon receipt of the test signal, the slave endpoint 116 may transmit a time of receipt message back to the master endpoint 112 such that the transmission delay can be calculated and inserted into the transmission delay field 316.

The resource status of the master endpoint 112 may also be maintained in the battery status field 320 and processing resource status field 324. The fields 320, 324 may be continually updated to reflect the current status of the resources. For example, the current status of the battery life may be reflected in the battery status field 320. Alternatively, the battery status field 320 may indicate that the mobile device is receiving power from an external source. The processing resource status field 324 may be updated as processing resources are allocated by the master endpoint 112. The processing resource status field 324 may indicate the total processing capacity (e.g., buffer space, memory space, processing capabilities) as well as the total amount currently in use. Alternatively, the processing resource status field 324 may be populated by percentages indicating relatively how much processing resources of the total available resources are currently in use. These two particular fields may be referenced to determine if an optional redirect path 136 needs to be established with a second mobile device in the local conference cloud 104.

FIG. 3B depicts a second data structure 328 in accordance with at least some embodiments of the present invention. The second data structure 328 may comprise an endpoint identifier field 332 similar to the endpoint identifier field 304 in the first data structure 300. The second data structure 328 may also comprise a local signal characteristics field 336 and a local signal volume field 340. The local signal characteristics field 336 and volume field 340 may be used to help cancel echo/feedback from the local audio sources such as the users 102 and any other sound generating means within range of the mobile device's microphone. The local signal characteristics field 336 may include description data for the received local signal in the form of frequency, pitch, tone, and so on. The data in this field describes one or more received local signals such that they can be differentiated by the master endpoint 112 during additional echo cancellation steps. There may be a plurality of local signals and signal characteristics provided for each endpoint. More particularly, one microphone may pickup speech uttered by its user 102 at a relatively high volume and speech uttered by another user 102 at a lesser volume. Each of the utterances may be separated by the conferencing module 120 and defined separately in the local signal characteristics field 336.

The local signal volume field 340 stores data that describes the volume or amplitude of each received local signal. As described above, speech uttered by a first user 102 may have a first volume while speech uttered by a second user 102 may have a second lower volume at the same microphone. Equally, another microphone may have a higher volume for the speech uttered by the second user 102 as compared to the speech uttered by the first user 102. Of course, the relative volume for each microphone may depend on the proximity of the signal source to the microphone.

Figure 4:
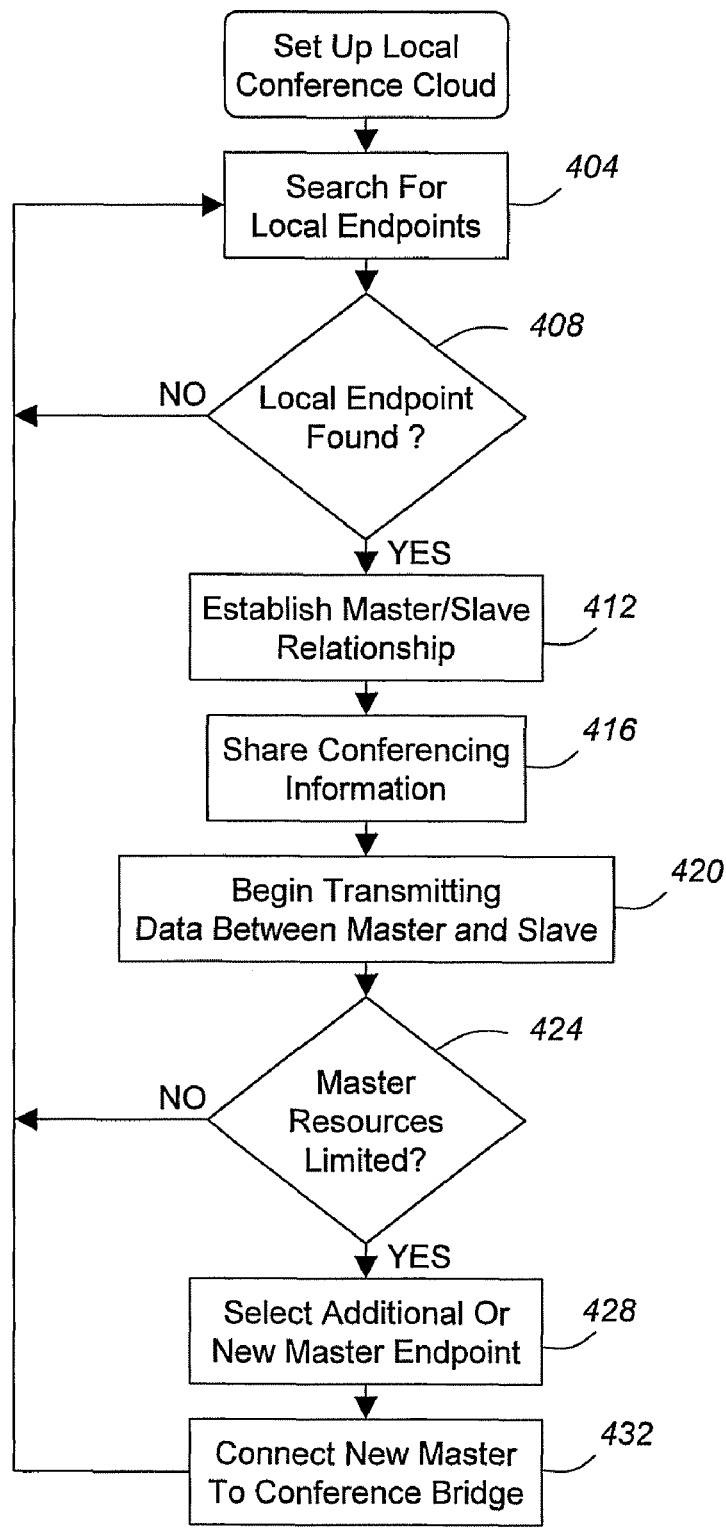
FIG. 4 is a flow diagram depicting a method of setting up a local conference cloud in accordance with embodiments of the present invention.

Referring now to FIG. 4, a flow diagram depicting a method of setting up and administering a local conference cloud 104 will be described in accordance with at least some embodiments of the present invention. The method begins with a communication device searching for another communication device within communication (e.g., wired or wireless) range (step 404). This searching step may be performed automatically (e.g., periodically or continuously) by the mobile device or may be user and/or event-initiated. The method continues by determining if the communication device has found another communication device that wants to participate in a common conference with the searching communication device (step 408). More specifically, in this step, when a communication device detects another communication device within wireless communication range, one communication device may ask if the other communication device wants to participate in the same conference. If this query is answered negatively, for example by a user 102 of the communication device, then the communication device will not consider the other communication device a local endpoint 112, 116, and will return to step 404 to continue searching for other communication devices.

However, if the query is answered affirmatively, either by a user 102 of the communication device or by the communication device automatically, then the communication device will consider the other communication device a local endpoint 112, 116. Upon determining that the two communication devices will participate in the same conference as local endpoints 112, 116, the method continues with the communication devices establishing a master/slave relationship (step 412). The master/slave relationship may be established automatically through a negotiation protocol or may be user 102 defined. The established master/slave relationship is then maintained in the data structure 300.

Upon establishing the master/slave relationship, the local endpoints 112, 116 share conferencing information with one another (step 416). The conferencing information that is shared between endpoints may include the wireless data transmission protocol and settings that will be used to communicate during the conference as well as each endpoint's address.

With the communication devices now set up to participate in a common conference, the method continues with the transmission of audio signals between the master 112 and slave 116 endpoints (step 420). As can be appreciated by one skilled in the art, the wireless connection 124, 204 may be employed to transmit the audio signals within the local conference cloud 104. The master endpoint 112 may then send/receive audio signals on behalf of the local conference cloud 104 to/from the conference bridge 108 or remote conference endpoint. This particular step continues throughout the duration of the conference. As the conference continues, the master endpoint 112 may monitor its resources to determine if it needs to offload some or all of its processing duties (step 424). The resources that are monitored may include the amount of battery power left in the master endpoint 112 as well as the amount of processing resources remaining in the master endpoint 112. If the master endpoint 112 determines that it has a suitable amount of resources available to continue operating in the current configuration of local endpoints, then the method will return to step 404 to continue searching for any other communication devices that want to join the conference.

On the other hand, if the master endpoint 112 determines that one or more of its resources are becoming too limited to continue handling the current processing payload (e.g., because batteries are running low or because it has met or is near its processing capacity as defined by a predetermined threshold), then the method continues by selecting an additional or new master endpoint 112 (step 428). The current master endpoint 112 may make this decision for all of the local endpoints 112, 116 based on its knowledge of the capabilities of each endpoint. Alternatively, the slave endpoints 116 may negotiate between one another through the master endpoint 112 to determine which slave endpoint 116 should assume the role of a master endpoint 112. Still further in the alternative, the users 102 of the endpoints 116 may make a decision regarding the master/slave relationship within the local conference cloud 104 and force one of the endpoints to become a master endpoint 112. Some of the other slave endpoints 116 may then be reassigned to the new master endpoint 112. Alternatively, the current slave endpoints 116 continue to communicate with the conference bridge 108 through the original master endpoint 112, while the new master endpoint is designated to serve any slave endpoint 116 that subsequently joins the local conference cloud 104.

Once the additional or new master endpoint 112 has been selected, the optional redirect path 136 may be established between the new master endpoint 112 and the conference bridge 108 or remote conference endpoint (step 432). At this point, the new master endpoint 112 communicates through the communication network with the conference bridge 108 or remote conference endpoint on behalf of the slave endpoints 116 it is serving. The method then returns to step 404 where the master endpoints 112 or just the new master endpoint 112 continue searching for additional communication devices to join the conference.

Figure 5:
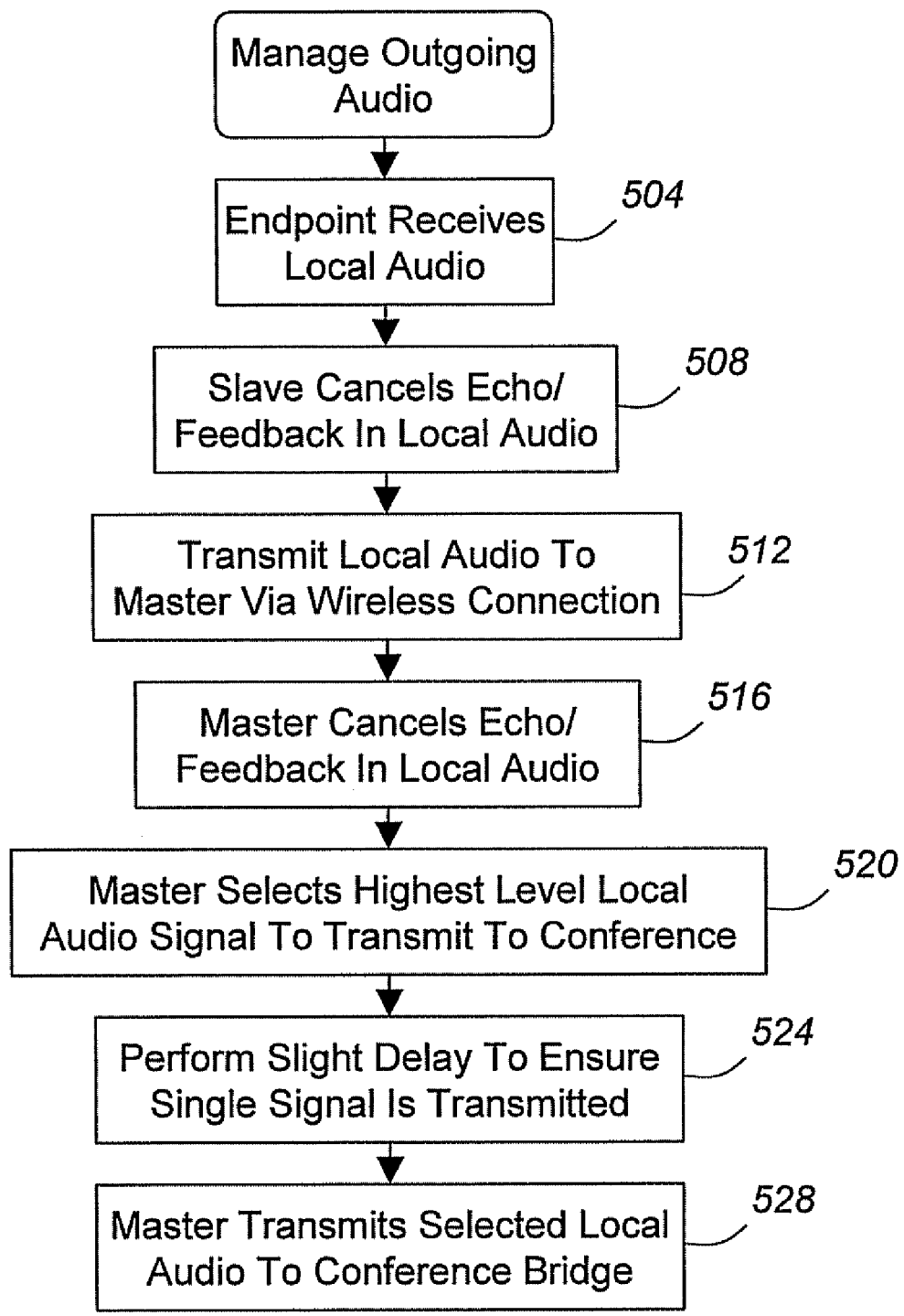
FIG. 5 is a flow diagram depicting a method of managing outgoing audio from a local conference cloud in accordance with embodiments of the present invention.

With reference now to FIG. 5, a method of managing outgoing audio 128, 208 will be described in accordance with at least some embodiments of the present invention. Initially, a slave endpoint 116 and master endpoint 112 may receive local audio from one or more audio sources in the local conference cloud 104 (step 504). Each endpoint 112, 116 may receive duplications of the same local audio source depending upon their proximity to the source and the sensitivity of the endpoint's 112, 116 microphone. The time of receipt of a single local source signal (e.g., a speech utterance by one user 102) may vary from endpoint to endpoint, again depending upon proximity to the local source.

When a slave endpoint 116 receives local audio at its microphone, the slave endpoint 116 employs its conferencing module 120 to cancel any echo/feedback in the received local audio (step 508). Any suitable type of echo cancellation algorithm may be employed in this step in accordance with embodiments of the present invention. It is most advantageous if the conferencing module 120 can cancel echo to the point that only signals meeting or exceeding a predefined amplitude threshold are included in the resultant audio signal.

The slave endpoint 116 then transmits the audio signal that has undergone echo cancellation to the master endpoint 112 via the wireless connection 124, 204 (step 512). In accordance with a preferred embodiment of the present invention, the audio signal is transmitted from the slave endpoint 116 to the master endpoint 112 using the Bluetooth data transmission protocol.

Upon receiving the audio signals from one or more slave endpoints 116, the master endpoint 112 employs its conferencing module 120 to cancel echo/feedback in the local audio received by its microphone (step 516). This echo cancellation step is similar to the echo cancellation step performed by the slave endpoints 116 in step 508. After the master endpoint 112 has cancelled the echo in its own received local audio, the master endpoint 112 determines the volumes of each local audio received from each slave endpoint 116 in addition to the volume of local audio received at its microphone. The master endpoint 112 may determine the relative volume for each signal received at each endpoint 112, 116, where a single endpoint may receive more than one local audio signal. By referencing the volumes of each local audio signal received from all of the microphones in the local conference cloud 104, the master endpoint 112 determines which local audio signal has the highest volume and selects that audio signal for transmission to the conference (step 520). Since each endpoint may receive more than one local audio signal the master endpoint 112 may mix portions of two or more inputs received from various endpoints 112, 116. Alternatively, the master endpoint 112 may attempt to select just the highest volume input corresponding to a signal received from just one endpoint 112, 116 and transmit that signal to the conference.

After the master endpoint 112 has selected the local audio signal having the highest volume, the master endpoint 112 imparts a slight delay on the order of microseconds (e.g., between 10 us to 100 us) to ensure that a single signal is transmitted to the conference (step 524). After the master endpoint 112 has imparted this delay and verified that no duplicate signals will be transmitted, the master endpoint 112 transmits the selected local audio signal to the conference bridge 108 or remote conference endpoint (step 528). The selected local audio signal is transmitted via the communication network as an outgoing audio signal 128, 208.

Figure 6:
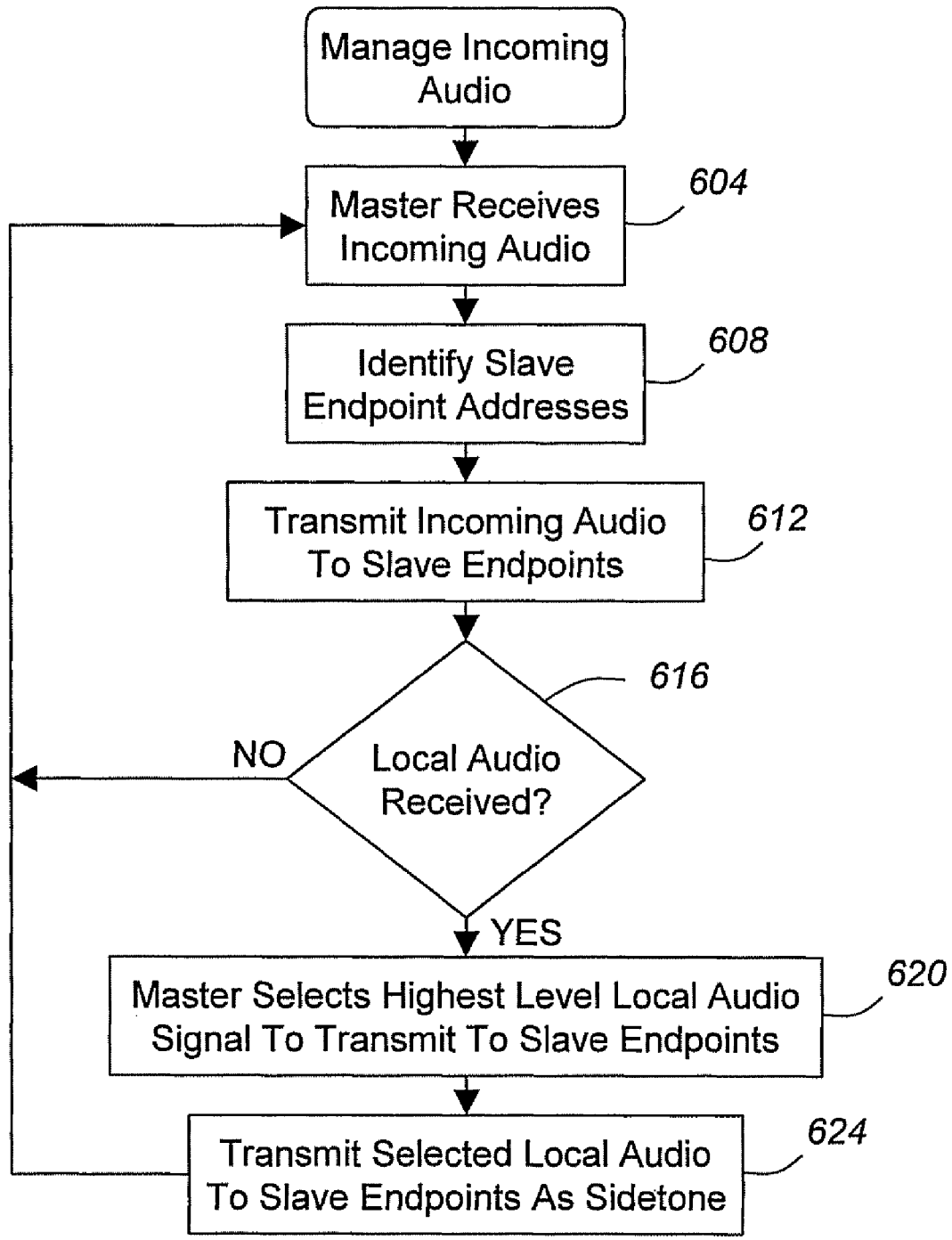
FIG. 6 is a flow diagram depicting a method of managing incoming audio to a local conference cloud in accordance with embodiments of the present invention.

With reference now to FIG. 6, a method of managing incoming audio 132 will be described in accordance with at least some embodiments of the present invention. Initially, a master endpoint 112 receives the incoming audio 132 from the conference bridge 108 or remote conference endpoint (step 604). The incoming audio 132 may be a signal from a single communication device (i.e., if it is received directly from a single remote conference endpoint) or a mixed signal from a plurality of communication devices (i.e., if it is received from the conference bridge 108). Upon receipt of the incoming audio 132, the master endpoint 112 employs the conferencing module 120 to identify the addresses of each slave endpoint 116 in the local conference cloud 104 (step 608).

When the conferencing module 120 identifies a slave endpoint 116 and its respective address, the conferencing module 120 will also determine the average amount of delay that is likely to occur when transmitting the audio signal to the slave endpoint 116. Once the conferencing module 120 has identified the amount of delay that may occur during transmission to each slave endpoint 116, the conferencing module 120 calculates the amount of relative delay that should be imparted to each signal as it is transmitted to a particular slave endpoint 116 and transmits the audio signal to each slave endpoint 116 via the wireless connection 124 (step 612). For example, if there are two slave endpoints 116 in the local conference cloud 104 and the probable delay between the master endpoint 112 and the first slave endpoint is about 5 ms whereas the probable delay between the master endpoint 112 and the second slave endpoint is about 10 ms, then the master endpoint 112 will delay transmission to the first slave endpoint 116 by about 5 ms to account for the differences in delay. Alternatively, the master endpoint 112 may transmit the audio signal to each slave endpoint 116 at the same time but request the first slave endpoint 116 to delay its playback of the audio signal for about 5 ms. Similarly, the master endpoint 112 will delay its playback of the audio signal for about 10 ms to account for the transmission delay to the second slave endpoint 116. This results in the synchronization the speakers of each slave endpoint 116 as they playback the audio signal.

After the output of the incoming audio 132 has been synchronized and played back via all of the speakers, the method continues to determine if the master endpoint 112 has received any additional local audio, for example from a user 102 of the master endpoint 112 (step 616). Likewise, the master endpoint 112 may receive local audio from another slave endpoint 116. If the master endpoint 112 has not received any local audio either directly or from some other slave endpoint 116, then the method returns to step 604 to await receipt of more incoming audio. On the other hand, if the master endpoint 112 does receive some local audio in addition to receiving the incoming audio 132, the master endpoint 112 compares the volumes of any instances of the local audio and selects the local audio with the highest volume for playback within the local conference cloud 104 (step 620). This step is similar to step 520 in that a comparison of volumes for a local audio signal is done to determine which local audio signal should be used for playback. However, in this step the local audio signal is selected for playback within the local conference cloud 104 as opposed to playback by a remote conference endpoint. Accordingly, after the master endpoint 112 has selected the local audio signal having the highest volume, the master endpoint 112 transmits the local audio to the slave endpoints 116 via the wireless connection as a sidetone (step 624). The master endpoint 112 may elect not to send the local audio back to the origin endpoint such that the user 102 of that endpoint 112, 116 does not experience feedback. Otherwise, the sidetone is played for all other users 102 in the local conference cloud 104 such that they can hear what another user 102 in the local conference cloud 102 said. The same delay precautions may be taken in this transmission step as were employed in step 612. By delaying transmission of the sidetone to one or more slave endpoints 116, the master endpoint 112 is able to synchronize the playback of the local audio, thereby making the user experience more enjoyable.

Embodiments of the present invention can be employed in situations where the endpoints 112, 116 are exclusively mobile devices connecting to one another via faster than audio wireless connections. Still other embodiments of the present invention can be employed in situations where one of the endpoints 112, 116 comprises a laptop computer or the like connected to a speakerphone, telephone, or similar type of conferencing unit.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for providing an ad-hoc conference station. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A conferencing method, comprising:
a first communication device detecting a second communication device within communication range of the first communication device;
determining that a user of the first communication device and a user of the second communication device want to participate in a common conference;
receiving local audio at the first communication device;
receiving local audio at the second communication device;
transmitting data representing the local audio received at the second communication device to the first communication device via a faster than audio connection;
the first communication device transmitting data representing the local audio received at the first and second communication devices to a remote communication device that is also part of the common conference;
receiving an audio signal from the remote communication device at the first communication device;
establishing a communication path between the second communication device and the remote communication device;
receiving, at the second communication device, a copy of the audio signal transmitted from the remote device to the first communication device; and
the first and second communication devices synchronizing playback of the audio signal received from the remote communication device;
further comprising:
determining signal volume for both the local audio received at the first communication device and the local audio received at the second communication device;
selecting the local audio that comprises a higher signal volume; and
using the selected local audio as the data that is transmitted to the remote communication device.

2. The method of claim 1, wherein the faster than audio connection comprises a wireless data transmission protocol.

3. The method of claim 1, further comprising: canceling echo in the local audio received at the second communication device prior to transmitting data representing the local audio received at the second communication device to the first communication device.

4. The method of claim 1, further comprising: delaying transmission of the data to the remote communication device to ensure that a single representation of a local audio signal is transmitted to the remote communication device.

5. The method of claim 1, further comprising:
receiving an audio signal from the remote communication device at the first communication device;
determining an amount of time required to transmit data from the first communication device to the second communication device;
delaying playback of the audio signal received from the remote communication device at the first communication device;
the first communication device transmitting data representing the audio signal received from the remote communication device to the second communication device via a faster than audio connection; and
playing the audio received from the remote communication device at the first and second communication devices at substantially the same time.

6. The method of claim 1, wherein the first communication device is a master communication device and the second communication device is a slave communication device, the method further comprising:
- determining that a third communication device is within wireless communication range of the first communication device;
- determining that a user of the third communication device wants to participate in the common conference;
- establishing a master slave relationship between the first and third communication devices;
- receiving local audio at the third communication device;
- the third communication device transmitting data representing the received local audio to the first communication device via a faster than audio connection; and
- the first communication device incorporating the data received from the third communication device into the data transmitted to the remote communication device.

7. The method of claim 1, wherein the first and second communication devices comprise at least one of a cellular phone, a laptop computer, a personal computer, a Personal Digital Assistant (PDA), and a phone.

8. The method of claim 1, wherein the remote communication device comprises at least one of a conference bridge, phone, cellular phone, laptop computer, personal computer, and Personal Digital Assistant (PDA).

9. A non-transitory computer readable medium comprising processor executable instruction operable to perform the method of claim 1.

10. A conferencing method, comprising:
- a first communication device detecting a second communication device within communication range of the first communication device;
- determining that a user of the first communication device and a user of the second communication device want to participate in a common conference;
- receiving local audio at the first communication device;
- receiving local audio at the second communication device;
- transmitting data representing the local audio received at the second communication device to the first communication device via a faster than audio connection;
- the first communication device transmitting data representing the local audio received at the first and second communication devices to a remote communication device that is also part of the common conference;
- receiving an audio signal from the remote communication device at the first communication device;
- determining an amount of time required to transmit data from the first communication device to the second communication device;
- delaying playback of the audio signal received from the remote communication device at the first communication device;
- the first communication device transmitting data representing the audio signal received from the remote communication device to the second communication device via a faster than audio connection;
- playing the audio received from the remote communication device at the first and second communication devices at substantially the same time;
- determining that resources of the first communication device are limited;
- establishing a communication path between the second communication device and the remote communication device;
- receiving a copy of the audio signal transmitted to the first communication device at the second communication device;
- skipping the transmitting data from the first communication device to the second communication device step; and
- the first and second communication devices synchronizing playback of the audio signal received from the remote communication device.

11. A first communication device, comprising:
a microphone for receiving local audio;
a conferencing module operable to establish a faster than audio data connection with a second communication device, receive data that represents local audio received at the second communication device, wherein the data is received from the second communication device over the faster than audio data connection, wherein the conferencing module is further operable to combine the data received from the second communication device with local audio received by the microphone and transmit the combined data to a remote communication device, and wherein the conferencing module is further operable to synchronize playback of an audio signal received from the remote communication device with the second communication device;
wherein the conferencing module is further operable to determine signal volume for both the local audio received at the first communication device and the local audio received at the second communication device, select the local audio that comprises a higher signal volume, and use the selected local audio as the data that is transmitted to the remote communication device.

12. The device of claim 11, wherein the faster than audio connection comprises a wireless data transmission protocol.

13. The device of claim 11, wherein the second wireless device is operable to cancel echo in the local audio received at the second communication device prior to transmitting data representing the local audio received at the second communication device to the first communication device.

14. The device of claim 11, wherein the conferencing module is further operable to delay transmission of the data to the remote communication device to ensure that a single representation of a local audio signal is transmitted to the remote communication device.

15. The device of claim 11, wherein the conferencing module is further operable to receive an audio signal from the remote communication device, determine an amount of time required to transmit data from to the second communication device, transmit data representing the audio signal received from the remote communication device to the second communication device via the faster than audio connection, and play the audio received from the remote communication device at substantially the same time as the second communication device.

16. The device of claim 11, wherein the conferencing module is further operable to determine that resources of the first communication device are limited and notify the second communication device that its resources are limited such that the second communication device can establish a separate connection with the remote communication device.

17. A conferencing system, comprising:
a plurality of local conference endpoints in communication with at least one remote conference endpoint, wherein the plurality of local conference endpoints communicate data with one another via a faster than audio data connection, wherein audio signals are transmitted from the at least one remote conference endpoint to a first local conference endpoint in the plurality of local conference endpoints, and wherein the first local conference endpoint is operable to transmit the audio signals to a second local conference endpoint in the plurality of local conference endpoints via the faster than audio data connection and cause the audio signals to be played from the first local conference endpoint at substantially the same time as the audio signals are played from the second local conference endpoint, and wherein the first local conference endpoint is configured to synchronize the playback of the audio signals with the second local conference endpoint;

wherein the audio signals received at the second local conference endpoint are transmitted to the first local conference endpoint via the faster than audio data connection, and wherein the first local conference endpoint transmits a combination of the audio signals received at the second local conference endpoint and audio signals received at the microphone of the first local conference endpoint to the remote conference endpoint.

18. The system of claim 17, wherein the first local conference endpoint is operable to delay its playback of the audio signals by an amount substantially equal to an amount of time required to transmit the audio signals from the first local conference endpoint to the second local conference endpoint.

19. The system of claim 17, wherein each of the plurality of local conference endpoints comprise a microphone for receiving local audio and a speaker from playing the audio signals received from the remote conference endpoint.

20. The system of claim 17, wherein each of the plurality of local conference endpoints are operable to perform echo cancellation on received local audio signals.

* * * * *